US011878278B2

(12) United States Patent
Debnam

(10) Patent No.: US 11,878,278 B2
(45) Date of Patent: Jan. 23, 2024

(54) VERSATILE BEVERAGE-TEMPERATURE MODULATOR AND SPILL PREVENTER

(71) Applicant: Antwaine J. Debnam, East Hartford, CT (US)

(72) Inventor: Antwaine J. Debnam, East Hartford, CT (US)

( * ) Notice: Subject to any disclaimer, the term of this patent is extended or adjusted under 35 U.S.C. 154(b) by 322 days.

(21) Appl. No.: 17/131,303

(22) Filed: Dec. 22, 2020

(65) Prior Publication Data

US 2021/0187459 A1 Jun. 24, 2021

Related U.S. Application Data

(60) Provisional application No. 62/952,936, filed on Dec. 23, 2019.

(51) Int. Cl.

*B01F 35/95* (2022.01)
*A47G 19/22* (2006.01)
(Continued)

(52) U.S. Cl.

CPC .......... *B01F 35/95* (2022.01); *A47G 19/2272* (2013.01); *A47G 19/2288* (2013.01);
(Continued)

(58) Field of Classification Search

CPC . A47G 19/2288; A47G 19/2272; B01F 27/09; B01F 27/112; B01F 31/445; B01F 35/95; B01F 35/2215; B01F 35/32025; B01F 35/4111; B01F 35/2205; B01F 35/221422; B01F 35/3204; B01F 35/2115; B01F 2101/14; B01F 2035/99; B01F 35/186; A47J 43/044

See application file for complete search history.

(56) References Cited

U.S. PATENT DOCUMENTS 3,011,768 A 12/1961 Frank
5,331,817 A 7/1994 Anthony
(Continued)

FOREIGN PATENT DOCUMENTS

CN 2857745 Y 1/2007
CN 204146901 U * 2/2015
(Continued)

OTHER PUBLICATIONS

Brown, F., & Diller, K. R. (2008). Calculating the optimum temperature for serving hot beverages. Burns, 34(5), 648-654. (Year: 2008).*

*Primary Examiner* — Walter D. Griffin
*Assistant Examiner* — Patrick M McCarty
(74) *Attorney, Agent, or Firm* — UConn IP Law Clinic; Nolyn Allen; Jon Clark

(57) ABSTRACT

A heating and stirring device is described herein that comprises a base configured to removably attach to one of a beverage container and a beverage container lid, the base containing a power supply, a controller, and a motor, and an agitator having a body and a length with a first end portion configured to be supported by the base, and a second end portion, wherein the first terminal end is configured to be outside of the beverage container and the second end portion is configured to be inside of the beverage container. Corresponding systems and methods also are disclosed.

20 Claims, 5 Drawing Sheets

(51) Int. Cl.

| | |
|---|---|
| ***B01F 27/09*** | (2022.01) |
| ***B01F 27/112*** | (2022.01) |
| ***B01F 31/445*** | (2022.01) |
| ***B01F 35/21*** | (2022.01) |
| ***B01F 35/22*** | (2022.01) |
| ***B01F 35/221*** | (2022.01) |
| ***B01F 35/32*** | (2022.01) |
| ***B01F 35/41*** | (2022.01) |
| *B01F 35/90* | (2022.01) |
| *B01F 101/14* | (2022.01) |

(52) U.S. Cl.

CPC ............ *B01F 27/09* (2022.01); *B01F 27/112* (2022.01); *B01F 31/445* (2022.01); *B01F 35/2115* (2022.01); *B01F 35/2205* (2022.01); *B01F 35/2215* (2022.01); *B01F 35/221422* (2022.01); *B01F 35/3204* (2022.01); *B01F 35/32025* (2022.01); *B01F 35/4111* (2022.01); *B01F 2035/99* (2022.01); *B01F 2101/14* (2022.01)

(56) References Cited

U.S. PATENT DOCUMENTS

| | | | | |
|---|---|---|---|---|
| 5,816,136 | A * | 10/1998 | Stallings | A47J 36/165 99/335 |
| 7,384,182 | B2 | 6/2008 | Bhavani | |
| 7,578,611 | B2 * | 8/2009 | Hamilton | B01F 27/191 366/326.1 |
| 8,092,072 | B2 * | 1/2012 | Parias Cruz | B01F 27/88 366/248 |
| 8,403,555 | B2 | 3/2013 | Wu | |
| 9,265,371 | B2 | 2/2016 | Glucksman | |
| 2006/0213903 | A1 * | 9/2006 | Lin | A47J 31/56 219/689 |
| 2007/0286016 | A1 | 12/2007 | Sun | |
| 2009/0280228 | A1 | 11/2009 | Gillinov | |
| 2015/0071027 | A1 | 3/2015 | Cados | |
| 2015/0122688 | A1 * | 5/2015 | Dias | A47G 19/027 206/459.1 |
| 2016/0280430 | A1 * | 9/2016 | Petlikovski | B65D 51/2835 |
| 2017/0280915 | A1 | 10/2017 | Boone | |
| 2018/0139979 | A1 * | 5/2018 | Glynn | A23F 5/26 |
| 2020/0015630 | A1 * | 1/2020 | Sammons | B01F 35/32025 |

FOREIGN PATENT DOCUMENTS

| | | | | |
|---|---|---|---|---|
| CN | 109330319 | A * | 2/2019 | |
| GB | 1508927 | A * | 4/1978 | A47J 43/044 |
| KR | 200467253 | Y1 | 6/2013 | |

* cited by examiner

VERSATILE BEVERAGE-TEMPERATURE MODULATOR AND SPILL PREVENTER

RELATED APPLICATIONS

This application claims priority to U.S. Provisional Application No. 62/952,936 filed Dec. 23, 2019.

TECHNICAL FIELD

The present disclosure generally relates to a device that inhibits a beverage from spilling while modulating and/or regulating the temperature of the beverage so as to assist in maintaining a user-preferred beverage temperature.

BACKGROUND

Commuting to a place of employment is a common activity for most American workers, with over 85% of the workforce, or 128 million people, commuting to work in an automobile. The average commute time for an American worker was over 27 minutes in 2017, with the average commute time as high as 40 minutes in some metropolitan areas (U.S. Census Bureau 2017 American Community Survey.

A large number of Americans also choose to drink coffee and other warm beverages, with most of them preparing the beverage at home or purchasing a prepared beverage from a retail location. Coffee specifically will cool from brewing temperature to 60° C.—the ideal coffee drinking temperature—within 35 minutes or less, depending on conditions and the style of beverage container. Thus, it is apparent that for a large portion of Americans who commute to work, their coffee may be too cold to drink by the time they reach their desk or office.

It would be useful to develop an apparatus that will enable a user to maintain a desired elevated temperature for a beverage.

SUMMARY

One embodiment described herein is an apparatus sized and configured to removably attach to a beverage container, the apparatus comprising a base and a moving agitator. In one embodiment, the base is configured to be removably attached to the outer surface of the beverage container. In other embodiments, the base is configured to removably attach to the opening of a beverage container lid. In some cases, the base is configured to be removably and frictionally attached to the beverage container or the lid.

In embodiments, the moving agitator is configured to fit through an opening of a beverage container lid. In some cases, the function of the moving agitator is not impaired by the absence of a lid. In embodiments, the base may further contain a battery or connection to a power source. In embodiments, the base additionally includes a control mechanism and an electrical mechanism. The agitator has a first end portion and a second end portion, wherein the first end portion is moveably attached to the base, and the second end portion is configured to have a larger surface area than the first end portion such that movement of the agitator can be effectively transferred to movement of the fluid. The first end portion of the agitator is configured to attach to the electrical mechanism, such that movement of the electrical mechanism is translated to motion of the first and second end portions of the agitator.

In some embodiments, a heating element, resistive or infrared, contained within the agitator is connected to the control mechanism. In other embodiments, the heating element is separate from the agitator. Optionally, one or more sensors may be contained within the agitator, communicably connected to the base and control mechanism, to provide input to the control mechanism. Those sensors may be one or more of a thermocouple, thermistor, temperature probe, semiconductor based integrated circuit (IC), resistance temperature detector (RTD), or other sensors known to those of skill in the art.

In one embodiment, a user may communicate with the apparatus to select a specific target or range of beverage temperature. A user may further specify a speed at which the agitator moves. The communication may be carried out through user interaction with the base, with user interaction with an external device such as a mobile phone, or other means of communication known to those of skill in the art.

One embodiment disclosed herein is a device comprising a base configured to removably attach to one of a beverage container and a beverage container lid, the base containing a power supply, a controller, a motor, and an agitator having a body and a length, with a first end portion including a first terminal end, the first end portion configured to be supported by the base, and a second end portion. The first terminal end is configured to be outside of the beverage container, and the second end portion is configured to be inside of the beverage container. In embodiments, the base contains a gear train and the motor is operably coupled to the gear train.

A method of using the above-described device also is disclosed, and comprises placing a lid with an opening onto a beverage container containing a liquid, affixing the device to the beverage container in an orientation allowing the body of the agitator to pass through the opening, and selecting a mode of operation for the device including at least one of a speed of motion for the agitator and a level of power for the heating element.

A further embodiment is a system comprising the above-described device, a portable beverage container having a liquid-holding capacity of no more than 40 ounces, a container lid with an opening through which to drink and which is configured to support the device when a user is not drinking, and an optionally connectable external power source.

Another embodiment described herein is a system comprising the device described above and a beverage container containing a liquid and an opening through which to drink; where the volume of the beverage container is no more than 40 ounces, or no more than 32 ounces, and the beverage container is portable; and an optionally connected external power source.

A further embodiment is a beverage stick comprising a heating and stirring component with a first end portion and a second end portion, the first end portion being configured to fit a sipping hole of a lid of a beverage cup, and the second end portion configured to contact a liquid in the beverage cup.

DETAILED DESCRIPTION

Figure 1:
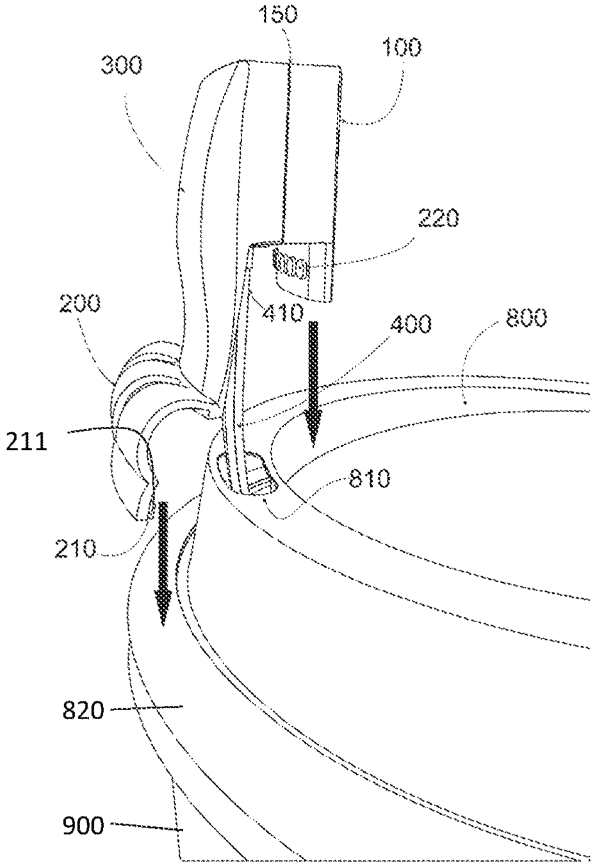
FIG. 1 illustrates a device 100 according to a first embodiment.

A solution to the problem described above is to provide a source of heat sufficient to slow the rate of cooling and extend the drinkable life span of coffee or other beverage, while also helping to agitate the brewed mixture such that it retains acceptable consistency along with temperature. The embodiments described herein comprise devices that are intended to agitate a liquid contained within a beverage container. Such a feature is useful where a drinkable liquid is not homogenous and requires agitation to ensure dissolved solids remain suspended in the liquid, as in the case of a brewed beverage like coffee or tea. Disclosed embodiments describe a unitary device that provides for simultaneous heating and agitation of a beverage disposed in a container, such as a single-serving beverage container.

One embodiment is a type of "splash stick" that inhibits a beverage from spilling from an opening in the lid of a beverage container and also modulates temperature of the beverage as directed by a user. An embodiment of the device has a heating element combined with a moving agitator, in order to allow the user to increase or decrease the temperature of a liquid and maintain a homogeneous consistency. The device may be sized to be small enough to fit securely into an opening in the lid of a beverage container, thereby not only preventing spills through the opening, but also allowing for convenient insertion and removal of the device from the container.

One embodiment may be comprised of a heating and stirring component with a first end portion and a second end portion, the first end portion configured to fit a sipping hole of a lid of a beverage cup, and the second end portion configured to contact a liquid in the beverage cup.

The device may further contain electrical and mechanical components. In one embodiment, an electrical mechanism creates the movement of a fluid agitator. Technology optionally can be included to measure the liquid's temperature. Heat can be applied or transferred to the liquid via technology, optionally, resistive or infrared components. The device may also use movement of the agitator to cool or heat a liquid, depending upon the temperature of the liquid and the speed of agitation. In one embodiment, the agitator can move back and forth, up and down, side to side, or swivel. Motion of the agitator may comprise one or more of those modes of movement. The agitator can take on many shapes and configurations, including but not limited to a propeller, spoon, paddle, whisk or wireform, or the like. In some embodiments, the agitator may be formed from a hard material, while other embodiments may feature a flexible agitator. Further embodiments may use an agitator with flexible and rigid portions. A portion of the agitator can be configured to deliver heat to the surrounding fluid. A variety of methods to do so may be implemented in embodiments, including an electrically resistive element or an infrared element.

Some embodiments may include means to communicate with a programmed application operating on a mobile device. The mobile device may be configured to allow the user to control various features and functions of the device, including but not limited to increasing or decreasing the temperature of the heating element, the mode of movement of the agitator, and the current temperature of the beverage.

Agitation is accomplished through the electrically-powered motion of an agitator, which may take the shape of a slender, elongated member such that it may fit through an opening in a beverage container. Motion may be imparted to the liquid through the use of that slender member, or optionally an integral or removable shape useful for moving liquid. Optionally, where the contained liquid has a temperature above room temperature, or where the user prefers to consume the liquid at a temperature above room temperature, the devices may introduce heat into the liquid to maintain and/or slow the rate of cooling of the contained liquid. Such a feature is useful for individuals who like to enjoy a warm beverage, like tea or coffee. It is apparent to consumers of such products that after a period of time, the temperatures of such brewed or mixed beverages may approach a low enough temperature as to make consumption of the beverage undesirable and unpleasant.

The device may also serve to duplicate the functions of a number of disposable or reusable devices, such as stir sticks, by providing a means to both agitate the beverage or liquid contained within a beverage container, while also blocking or obstructing any openings in the beverage container such that liquid may not easily spill or leak from the beverage container. The device may be easily removed and installed onto a beverage container for the purposes of cleaning or transition to a new beverage. The device may also be easily charged using a charging cable removably connected to a DC power supply, and the device may be powered using that same DC power supply or, optionally, through an on-board power storage device such as a battery. The device may be controlled, powered on, or powered off through physical interaction with the device itself. The device may be optionally controlled using a programmed application operating on a mobile device in wireless communication with the device.

The present disclosure describes aspects of the disclosed embodiments with reference to the exemplary embodiment illustrated in the drawings; however, aspects of the present invention are not limited to the exemplary embodiment illustrated in the drawings. It will be apparent to those of ordinary skill in the art that aspects of the present invention may include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

Figure 2:
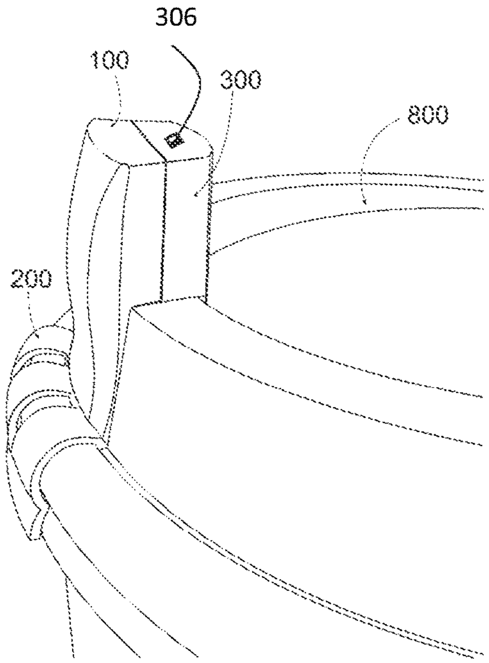
FIG. 2 illustrates a device 100 according to a first embodiment as installed into a use position.

FIGS. 1 and 2 illustrate a preferred embodiment of the device 100 as it may interact with a beverage container 900 (shown in part) with a lid 800. The lid 800 may feature an opening 810 through which an individual may drink the liquid contained within the beverage container. The lid may also feature a rim 820, while the beverage container may feature a corresponding rim, and the two rim features may interlock as to attach the lid to the beverage container in an arrangement very common in the art. In some embodiments, the device 100 and the lid 800 may be permanently attached such that they comprise a single piece, and then secured to the rim of a beverage container without a lid.

In the illustrated embodiment, the device 100 includes a base 300 and an agitator 400. The agitator 400 includes an elongated portion 430 and a paddle 500. The agitator 400, including the elongated portion 430 and the paddle 500 (not pictured in the view of FIGS. 1 and 2) are sized and configured such that the paddle 500 and at least a portion of the agitator 400 may pass through the lid opening 810. In some embodiments, the agitator 400 and paddle 500 may be constructed from a flexible material to facilitate insertion through the lid opening. In some embodiments, the lid opening through which the device is inserted may be independent of the opening through which the user may drink the beverage, such that the device would not need to be removed to consume the beverage. In other embodiments, the beverage container may not feature a lid, with the device then mounting to the rim of the beverage container.

In the embodiment shown in the figures, the body of the device 100 is removably and frictionally secured to the beverage container and lid through the use of a clip 200 comprised of an outer surface 201, an inner surface 202, and an upper surface 203, at least one of which is configured to be in contact with the surface of the lid when the device is in use. In some embodiments the device is further secured by the clip through a positive engagement feature 210 and pads 220. An inner surface of the positive engagement feature 211 may also additionally contact the beverage container or in some configurations the lid. The arrows in FIG. 1 show the direction in which forces may be applied to secure the device to the beverage container and lid. Completion of the installation process is illustrated in FIG. 2, where the upper surface of the clip 203 has also served to block the opening 810 such that spillage may be prevented or mitigated, further obstructing any air pathways to the inside of the beverage container that may allow for convection currents to carry heat away from the liquid contained within (in applications where the liquid has a temperature above room temperature, such as a warm or hot cup of coffee or tea). In the illustrated embodiment, the elongation portion 430 of the agitator 400 is semi-rigid width dimensions of width and thickness that allow it to easily pass through the opening 810 in the lid 800, and the paddle 500 is flexible and collapsible to allow it to be gently pushed through the opening 810 and then return to its extended shape, which is shown in the figures.

The base 300 of the device 100 has a wall thickness, comprising a cavity surrounded by a wall forming a housing. In some embodiments, the housing may be injection molded in two or more pieces, and joined along the parting line 150 as one example, though the housing may be molded or formed in other planes and thus feature a parting line in an alternate orientation. In some embodiments, the internal components of the device may be installed into the housing prior to a unification process, where the process might be one of gluing, sonic welding, melting, or the use of positive engagement features and optionally a seal. In embodiments, the internal components may include one or more of a controller capable of regulating amperage and voltage in response to a variety of inputs, a motor in electrical communication with the controller, a gear train operably connected to the motor, an electrical connector capable of receiving power from a DC power supply such as a USB port, an on-board power supply such as a battery, and a proximate end portion 410 of the agitator 400. One or more of these components may also be installed on a printed circuit board or assembly, itself further secured within the housing through the use of bosses, key ways, compression, adhesives, or an independent structure. The proximate end portion of the agitator 410 may be supported directly by the gear train, or a separate bearing, or a pin riding on a surface of the housing where the pin is formed off of an end of the agitator. The motor and gear train may be further secured within the housing through the use of standoffs, key ways, compression, adhesives, or an independent structure. The gear train may be created from a planetary gear set to improve the torque output of a small electric motor, and optionally or in conjunction with a cam such that any contact between the gear train and the end of the agitator may be on a single point, frictional, yet non-continuous or impermanent. In embodiments, an on-off switch 306 is included on the base 300.

Figure 3:
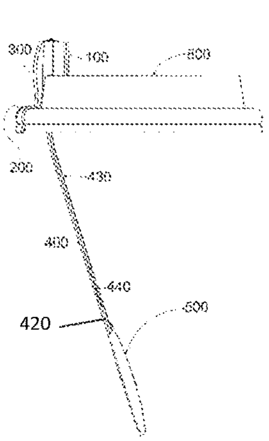
FIG. 3 is a side view of the device 100 as placed on a lid 800.
Figure 7:
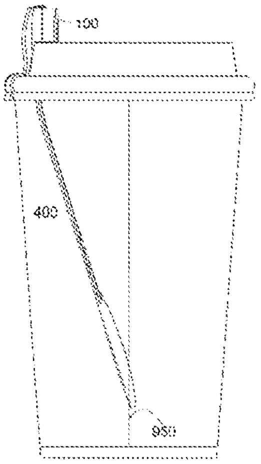
FIG. 7 is a side view of the device 100 as placed on a lid 800 of a beverage container 900.

FIGS. 3 and 7 illustrate a side view of the device as attached, or optionally integral to, the lid 800. In some embodiments, the inner surface of the positive engagement feature 211 may engage the bottom of the lid rim 820, further securing the device. FIG. 7 further illustrates the device in conjunction with a lid and beverage container 900. Those skilled in the art will appreciate that the angle of the agitator 400 (when in an "off" position) is offset from the vertical such that the agitator will not contact the side walls of the beverage container. There are a number of possible and acceptable angles, such that a range exists in which the device is functional, and no particular angle is required. In some embodiments, the paddle 500 of the agitator 400 is formed from a flexible material and configured to avoid the effects of plastic deformation during the insertion and removal process when the device is used in a beverage container. Additionally, the agitator 400 in preferred embodiments contains a heating element 440, shown schematically in FIG. 12, such that heat energy may be imparted to the liquid within the beverage container. Those familiar in the art will appreciate the existence of a number of suitable types of heating elements for this purpose, as well as the number of ways they may be incorporated into the agitator, among those an over-mold process, a hollow body of the agitator, and others. The heating element 440 may extend from the proximate end portion 410, where it may be in electrical communication with the controller or an alternate source of energy from which to power the heating element 440. The heating element 440 may further traverse the body of the agitator to the distal end portion 420. At the distal end portion 420 of the agitator is a means of imparting the energy delivered through the agitator across a larger surface area such that it may be effectively transmitted into the liquid contained within the beverage container. In some embodiments, this aspect may be fashioned as a paddle 500. In preferred embodiments, the paddle is a thin member formed from a flexible and elastic material with a slight degree of rigidity such that the first face of the paddle 501 will remain oriented roughly normal to the path of travel of the agitator during one portion of movement, while the second face of the paddle 502 will remain oriented roughly normal to the return path of travel of the agitator. The paddle may be integrally formed with the agitator, as would be the case if the element was injection molded as a single element, or even in a co-mold or over-mold process such that the agitator and paddle comprise a single piece. The paddle may also be independently made, and attached in a removable or permanent fashion through the union of a connection on the agitator 430 and a connection on the paddle 530, such as a positive engagement feature, a key way, sonic welding, gluing, melting, or the use of fasteners among other techniques. In preferred embodiments, the paddle is formed from a flexible, food-safe material such that it may be folded up to pass through the opening of a beverage container. The overall shape of the paddle 500 may optionally be more akin to a whisk, or other type of wire form. In some embodiments, the heating element may continue through the distal end portion 420 and into, or in contact with, the body of the paddle 500 such that the larger surface area of the paddle may be used by the heating element to more efficiently transfer energy into a liquid.

In preferred embodiments, the heating element is sized such that it is capable of delivering energy to the liquid sufficient to maintain the internal temperature of a freshly brewed cup of coffee above 50 degrees Celsius for a period of 30 minutes. In preferred embodiments, the agitator contains a heating element sized such that it is capable of delivering energy to the liquid such that the liquid remains above thirty degrees Celsius.

Figure 4:
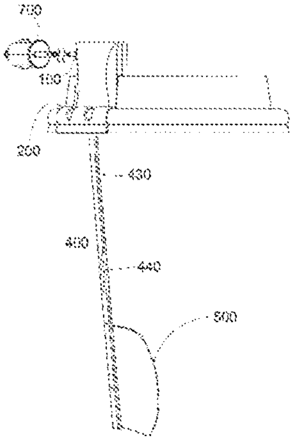
FIG. 4 is a three-quarter view of the device 100 as placed on a lid 800.
Figure 5:
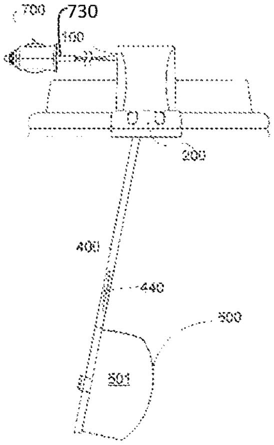
FIG. 5 is a front view of the device 100 as placed on a lid 800.
Figure 8:
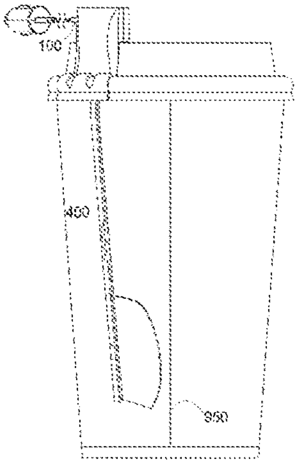
FIG. 8 is a three-quarter view of the device 100 as placed on a lid 800 of a beverage container 900.
Figure 9:
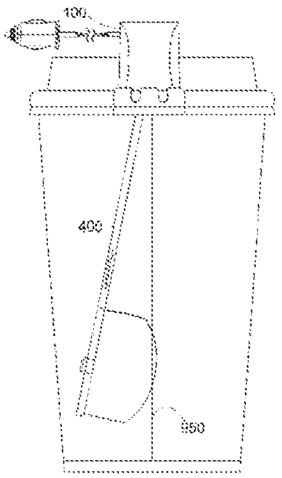
FIG. 9 is a front view of the device 100 as placed on a lid 800 of a beverage container 900.
Figure 11:
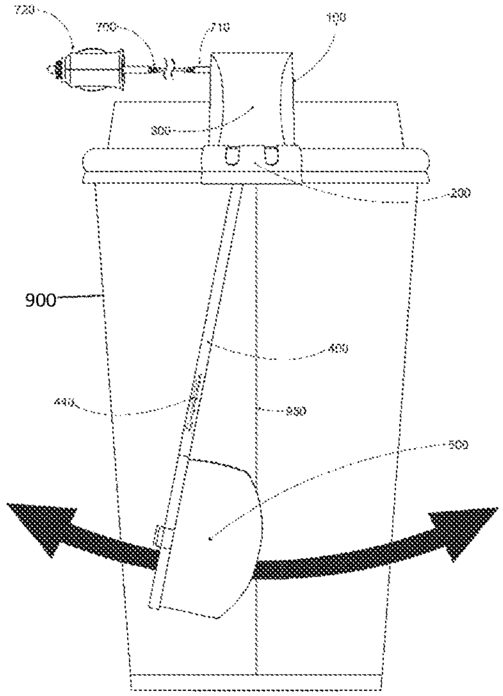
FIG. 11 illustrates a method of operation of the device 100 as placed on a lid 800 of a beverage container 900.

FIGS. 4 and 8 illustrate a three-quarter view of the device with and without a beverage container, respectively. FIGS. 5 and 9 depict a front view of the device. In this view, the removably connected electrical cable 700 is visible. The cable features a first end portion 710, cable attaches to a electrical connector contained within the housing comprised by the body 100, and is in electrical communication with the controller and battery. In preferred embodiments, the electrical cable 700 features a second end portion 730 that is configured to be attached to a DC power supply, such as a male plug for a 12V cigarette lighter or receptacle in an automobile, or a USB-type port present in an automobile, computer, wall outlet, among other options known to those familiar in the art. FIG. 11 illustrates one such combination, using an automobile 12V socket adapter 720. The central portion of the cable may be of any length necessary, or removable where the adapter 720 provides its own removable electrical connector.

Figure 6:
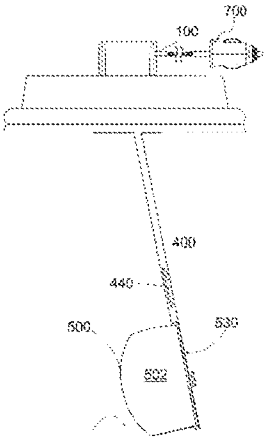
FIG. 6 is a rear view of the device 100 as placed on a lid 800.
Figure 10:
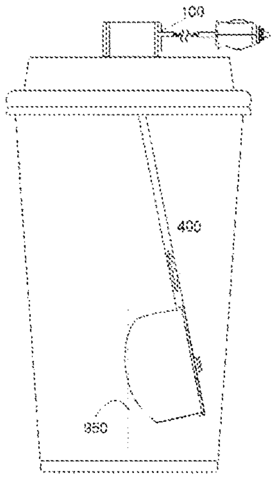
FIG. 10 is a rear view of the device 100 as placed on a lid 800 of a beverage container 900.

FIGS. 6 and 10 illustrate a rear view of the device. FIG. 10 further illustrates an imaginary line 950 normal to the base of the beverage container, drawn for construction purposes only, to demonstrate the maximum angles between which the agitator might be driven by the motor and gear train. A preferred range of motion may line within 30-degrees of tilt on either side of the normal line where the beverage container is of a common commercial size for a 12-20 ounce container, or a 12 to 32 ounce container, such as a disposable fiber coffee cup. It may be appreciated that, depending on the orientation of the paddle 500, the agitator may not have equal angles at its maximum travel on either side of the normal line 950.

Figure 12:
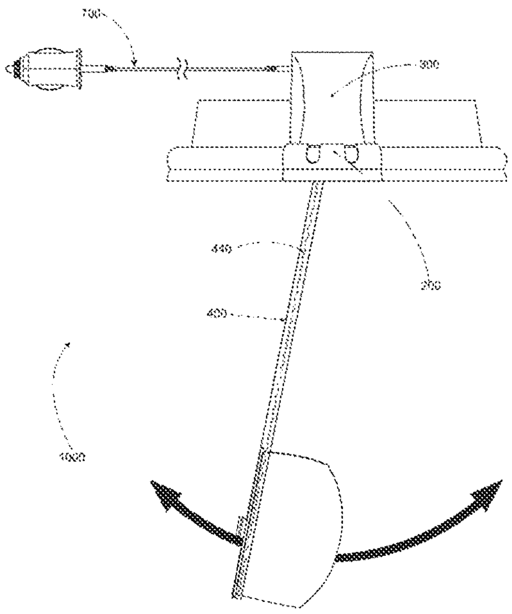
FIG. 12 illustrates a method of operation of the device 100.
Figure 13:
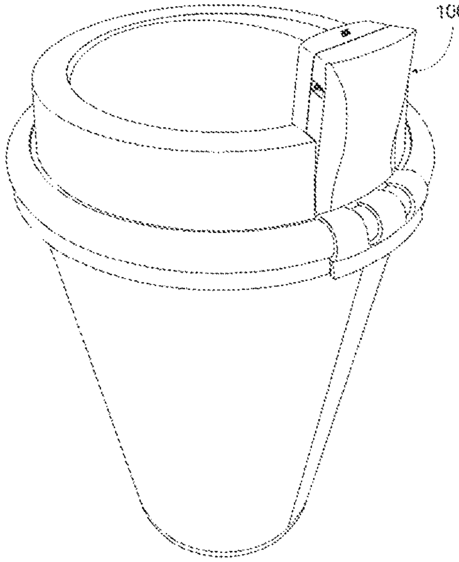
FIG. 13 is an isometric view of the device 100 as placed on a lid 800 of a beverage container 900.
Figure 14:
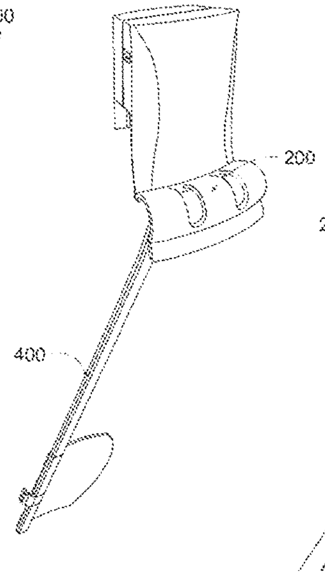
FIG. 14 is an isometric view of the device 100.
Figure 16:
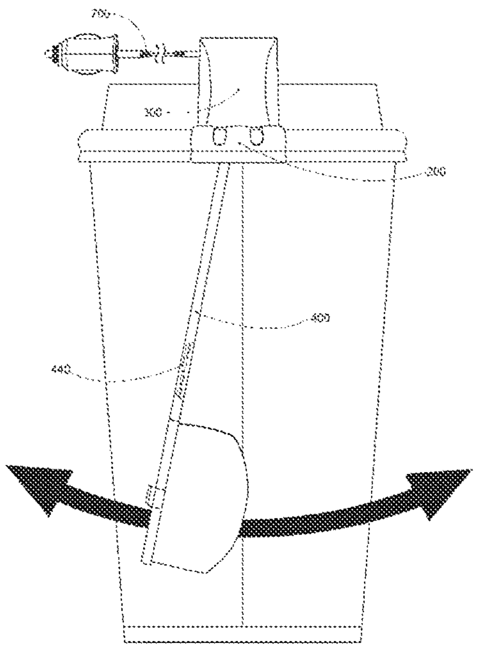
FIG. 16 illustrates a method of operation of the device 100 as placed on a lid 800 of a beverage container 900 with an optionally connected power supply 200.

FIGS. 12 and 16 show a system 1000 that includes the device 100 in combination with an electrical cable 700. FIGS. 12 and 16 illustrate a preferred mode of operation of the agitator, gear train, and motor. Here, the agitator body 400 and the paddle 500 move in a pendulum-like motion as driven by the motor and gear train, which as mentioned above may or may not feature co-equal maximums. In some embodiments, different sizes and scales of the disclosed device may be used to achieve differences of distance between the maximum points on the arc of travel for use in larger or smaller beverage containers. In other embodiments, the controller may receive an input from the user specifying the maximum points on the arc of travel, or a programmed application may infer such measurements based upon a user selection and specification of the general volume of the beverage container. FIGS. 13 and 14 illustrate isometric views of the device as attached to a beverage container with a lid, and the device independently in space.

Figure 15:
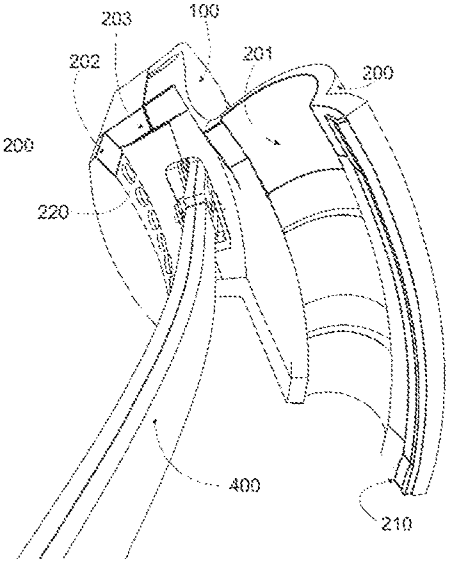
FIG. 15 is an isometric view of the device 100, looking upwardly at the base.
Figure 17:
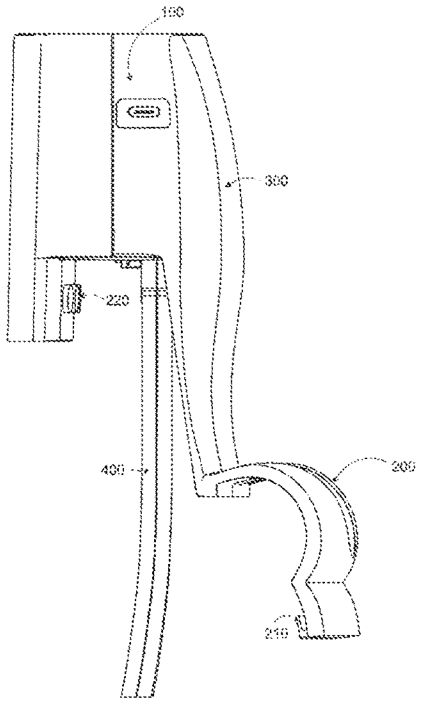
FIG. 17 shows a side view of the device 100.

FIGS. 15 and 17-19 show additional details of the construction and operation of the device 100. FIG. 15 illustrates an isometric bottom view of the device where the positive engagement features 210 and the pads 220 of the clip 200 are visible. As mentioned above, though not depicted in the referenced figure, are a number of contact surfaces 201, 202, 203, and 211. The proximate end portion 410 of the agitator 400 is also visible where it enters the housing 100. In preferred embodiments, this opening is concealed and sealed by the use of a gasket or equivalent element, such that liquid may not enter the interior of the housing and damage the electrical components within, and to facilitate a simple sanitizing process such that a user may easily clean the device after use. FIG. 17 shows a side view of the base and upper portion of the agitator 400.

Figure 18:
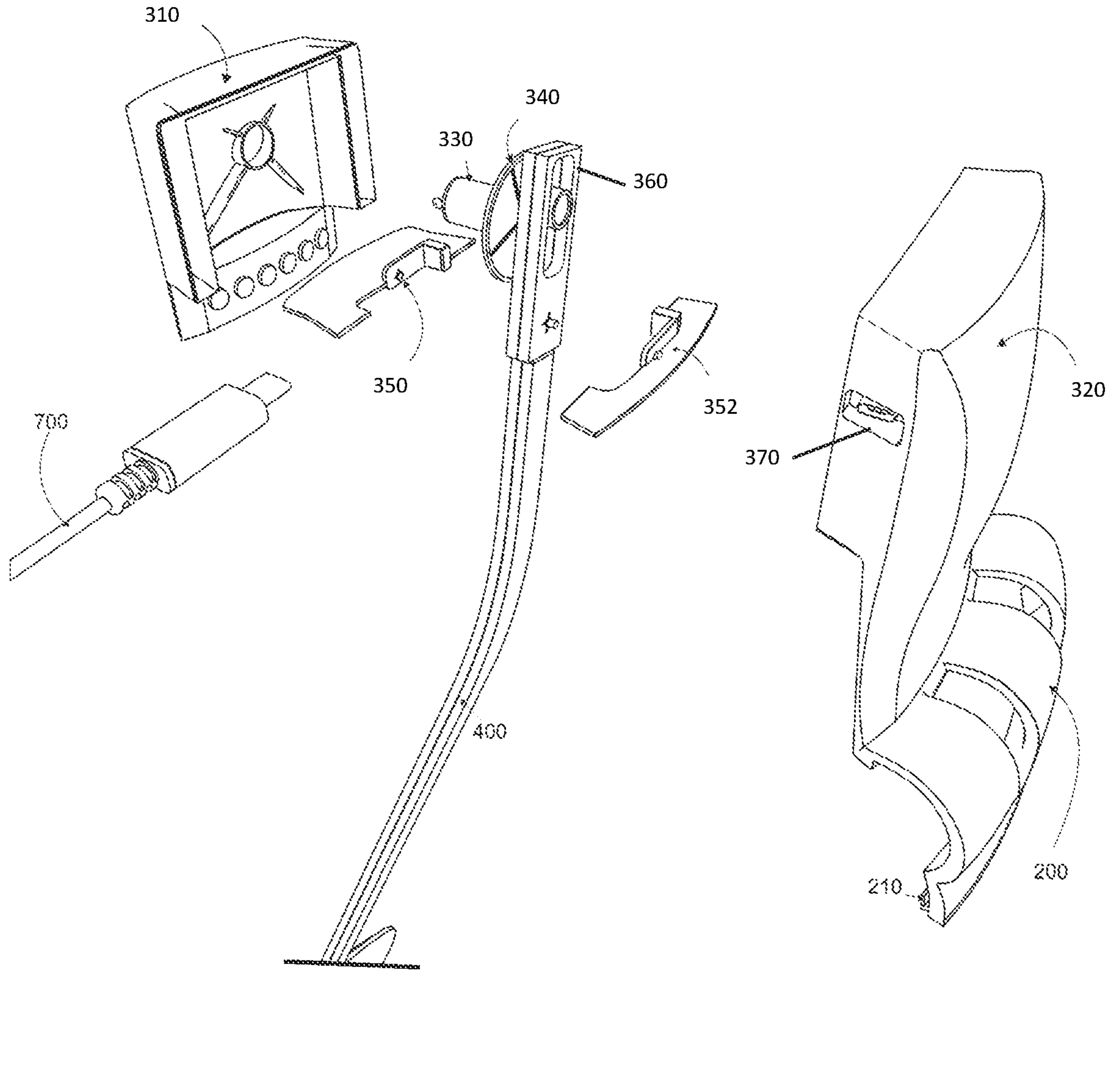
FIG. 18 provides an exploded view of the device 100.
Figure 19:
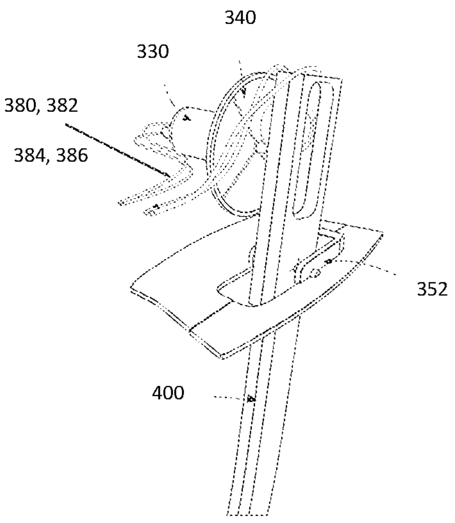
FIG. 19 shows details inside the base 300.

FIG. 18 is an exploded view of the base 300 and the connection with the agitator 400. A first casing portion 310 and a second casing portion 320 form a housing that contains a motor 330, a gear 340 a first shaft holder 350 and a second shaft holder 352. The gear 340 is coupled to a connector 360 that forms the upper end of the agitator 400. The second casing portion 320 includes a electrical port 370 configured to receive a power cord 700. FIG. 19 shows wires 380, 382, 384, 386 employed for operation of the agitator 400.

Figure 20:
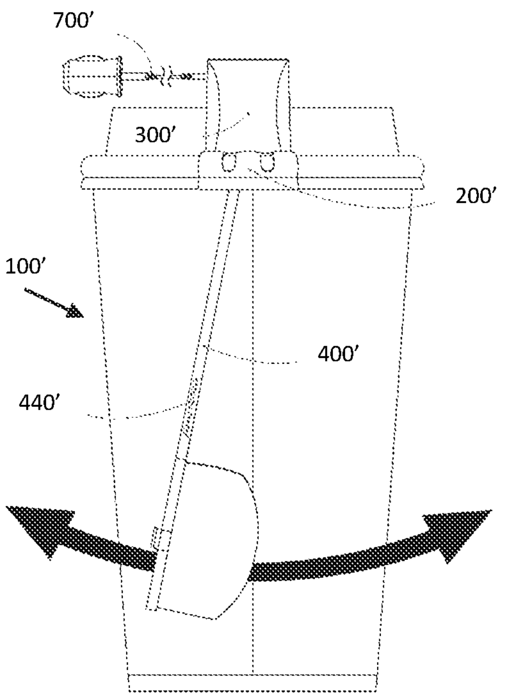
FIG. 20 illustrates an embodiment in which the controller is operably connected to a separate electronic device.
Figure 20:
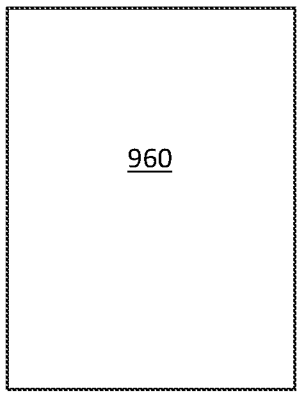

FIG. 20 shows an embodiment in which a user may employ a remote electronic device 960, such as a mobile phone, to communicate with the device 100' to select a specific target or range of beverage temperature. In this embodiment, the device includes a base 300' mounted to a beverage lid with a clip 200'. The agitator 400' contains a heating element 440'. A user may further specify a speed at which the agitator moves.

A number of alternatives, modifications, variations, or improvements therein may be subsequently made by those skilled in the art, which are also intended to be encompassed by the following claims.

What is claimed is:

1. A device, comprising:

a base configured to removably attach to a beverage container lid having a sipping hole and a rim, the base including a mounting mechanism configured to be removably mounted to the rim of the beverage container lid, and containing a power supply, a controller, and a motor; and an agitator having a body and a length, with a first end portion including a first terminal end, the first end portion configured to be supported by the base, and a second end portion, wherein the first terminal end is configured to be outside of the a beverage container, and the second end portion is configured to be inside of the beverage container, the body of the agitator including a heating element sized to impart energy into the liquid such that the liquid remains above thirty degrees Celsius;

wherein the second end portion of the agitator is configured to flexibly pass through the sipping hole, and the device is configured to completely cover the sipping hole during use.

2. The device of claim 1, wherein the base contains a gear train, and the motor is operably coupled to the gear train.

3. The device of claim 1, wherein the second end portion of the agitator is formed to support at least one of a paddle, a whisk, and a wireform.

4. The device of claim 1, wherein the second end portion of the agitator comprises at least one of a paddle, a whisk, and a wireform.

5. The device of claim 1, wherein the controller is wirelessly communicable through a programmed application using an electronic apparatus, the controller responding to input from the electronic apparatus.

6. The device of claim 1, wherein the agitator includes a temperature sensor, and the controller modulates power to the heating element in response to the sensor.

7. The device of claim 6, wherein the temperature sensor is communicably attached to the controller.

8. The device of claim 7, wherein the controller is electrically attached to the power supply, and wherein the controller modulates power to the motor.

9. The device of claim 8, wherein the power supply is one of a battery and an electrical connector removably connected to a DC power supply.

10. The device of claim 1, wherein an axis drawn from the second end portion of the agitator through the first end portion is at an angle between 1 and 30 degrees, where the angle is measured relative to a plane normal to a base of the beverage container.

11. The device of claim 1, wherein the mounting mechanism is a clip.

12. A system comprising:

the device of claim 1;

a portable beverage container having a liquid-holding capacity of no more than 40 ounces;

a beverage container lid, wherein the container lid is configured to support the device of claim 1 when a user is not drinking.

13. The system of claim 12, further comprising a programmed application operating on an electronic apparatus, the application in communication with the device, the communication comprising at least one of the temperature of the liquid, the desired power level of the heating element, and the speed of operation of the agitator.

14. A beverage stick comprising:

a heating and stirring component with a first end portion and a second end portion, the first end portion including a base configured to removably attach to a beverage container lid having a sipping hole and a rim, the base containing a controller and a motor operated by the controller, the first end portion being configured to be mounted proximate the sipping hole and to completely cover the sipping hole, the first end portion including a mounting mechanism configured to be removably mounted to the rim of the beverage container lid, and the second end portion including at least one of a paddle, a whisk and a wireform configured to contact and agitate a liquid in the beverage cup, the second end portion being configured to flexibly pass through the sipping hole to place the beverage stick in an operating position in the beverage cup.

15. The beverage stick of claim 14, wherein the second end portion of the heating and stirring component includes a paddle.

16. The beverage stick of claim 14, wherein the controller is wirelessly connected communicable through a programmed application using an electronic apparatus, and a mode of operation for heating and stirring is selected using the electronic apparatus.

17. The beverage stick of claim 16, wherein the electronic apparatus is a mobile phone.

18. A method comprising:

obtaining a liquid-containing beverage container with a beverage container lid mounted to the beverage container, the beverage container lid having a sipping hole and a rim;

obtaining a device comprising:

a base configured to removably attach to the beverage container lid, the base including a mounting mechanism configured to be removably mounted to the rim of the beverage container lid, and, containing a power supply, a controller, and a motor; and an agitator having a body and a length, with a first end portion including a first terminal end, the first end portion configured to be supported by the base, and a second end portion, the body of the agitator including a heating element configured to heat a liquid such that the liquid remains above thirty degrees Celsius, the second end portion of the agitator including at least one of a paddle, a whisk and a wireform configured to flexibly pass through the sipping hole in the beverage container lid, passing the second end portion of the agitator downwardly through the sipping hole, mounting the device to the beverage container lid to fully cover the sipping hole, wherein the second end portion is positioned inside the beverage container and the first terminal end is outside the container, and selecting a mode of operation for the device including at least one of a speed of motion for the agitator and a level of power for the heating element.

19. The method of claim 18, wherein the controller is wirelessly connected communicable through a programmed application using an electronic apparatus, and the mode of operation is selected using the electronic apparatus.

20. The method of claim 19, wherein the heating element heats a beverage to a target temperature and is controlled by the electronic apparatus.

* * * * *